United States Patent
Gabrielov et al.

(10) Patent No.: US 9,988,582 B2
(45) Date of Patent: Jun. 5, 2018

(54) METHOD FOR RESTORING ACTIVITY TO A SPENT HYDROPROCESSING CATALYST, A SPENT HYDROPROCESSING CATALYST HAVING RESTORED CATALYTIC ACTIVITY, AND A HYDROPROCESSING PROCESS

(71) Applicant: SHELL OIL COMPANY, Houston, TX (US)

(72) Inventors: Alexei Grigorievich Gabrielov, Houston, TX (US); Ed Ganja, The Woodlands, TX (US); Salvatore Philip Torrisi, The Woodlands, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days. days.

(21) Appl. No.: 14/684,580

(22) Filed: Apr. 13, 2015

(65) Prior Publication Data
US 2015/0259611 A1 Sep. 17, 2015

Related U.S. Application Data

(62) Division of application No. 13/208,167, filed on Aug. 11, 2011, now Pat. No. 9,029,281.
(Continued)

(51) Int. Cl.
| | |
|---|---|
| *B01J 23/94* | (2006.01) |
| *B01J 23/96* | (2006.01) |
| *B01J 27/28* | (2006.01) |
| *B01J 27/32* | (2006.01) |
| *C10G 45/04* | (2006.01) |
| *B01J 27/19* | (2006.01) |

(Continued)

(52) U.S. Cl.
CPC .............. *C10G 45/04* (2013.01); *B01J 23/94* (2013.01); *B01J 27/19* (2013.01); *B01J 27/24* (2013.01); *B01J 27/285* (2013.01); *B01J 37/0203* (2013.01); *B01J 38/02* (2013.01); *B01J 38/50* (2013.01); *B01J 38/52* (2013.01); *B01J 38/62* (2013.01); *B01J 38/66* (2013.01); *C10G 49/02* (2013.01); *C10G 2300/703* (2013.01)

(58) Field of Classification Search
CPC . B01J 23/94; B01J 23/96; B01J 27/285; B01J 27/32
USPC .............. 502/20, 22, 29, 31, 32, 38, 56, 167
See application file for complete search history.

(56) References Cited

U.S. PATENT DOCUMENTS

| | | |
|---|---|---|
| 3,838,070 A | 9/1974 | Thomas |
| 7,696,120 B2 | 4/2010 | Ginestra et al. |

(Continued)

FOREIGN PATENT DOCUMENTS

| | | |
|---|---|---|
| CN | 1921942 | 2/2007 |
| CN | 101374931 | 2/2009 |

(Continued)

OTHER PUBLICATIONS

Delley, B., An all-electron numerical method for solving the local density functional for polyatomic molecules, J. Chem. Phys., 92 (1), pp. 508-517 (1990).
(Continued)

*Primary Examiner* — Cam N. Nguyen
(74) *Attorney, Agent, or Firm* — Charles W. Stewart

(57) ABSTRACT

A regenerated spent hydroprocessing catalyst treated with a chelating agent and having incorporated therein a polar additive.

12 Claims, 1 Drawing Sheet

Related U.S. Application Data

(60) Provisional application No. 61/373,464, filed on Aug. 13, 2010.

(51) Int. Cl.

| | |
|---|---|
| *B01J 37/02* | (2006.01) |
| *B01J 38/02* | (2006.01) |
| *B01J 38/50* | (2006.01) |
| *B01J 38/52* | (2006.01) |
| *B01J 38/62* | (2006.01) |
| *B01J 38/66* | (2006.01) |
| *C10G 49/02* | (2006.01) |
| *B01J 27/24* | (2006.01) |

(56) References Cited

U.S. PATENT DOCUMENTS

| | | |
|---|---|---|
| 7,820,579 B2 | 10/2010 | Ginestra |
| 8,128,811 B2 | 3/2012 | McCarthy et al. |
| 8,278,234 B2 | 10/2012 | Galliou et al. |
| 8,377,839 B2 | 2/2013 | Galliou et al. |
| 9,211,536 B2 * | 12/2015 | Gabrielov ............... B01J 23/85 |
| 9,724,679 B2 * | 8/2017 | Gabrielov ............... B01J 27/19 |
| 2005/0159296 A1 | 7/2005 | Ginestra et al. |
| 2007/0275845 A1 | 11/2007 | Jansen et al. |
| 2008/0194892 A1 | 8/2008 | Cholley et al. |
| 2009/0258779 A1 | 10/2009 | McCarthy et al. |
| 2009/0261019 A1 | 10/2009 | McCarthy et al. |
| 2009/0298677 A1 | 12/2009 | Radlowski et al. |
| 2010/0236988 A1 | 9/2010 | Gabrielov et al. |
| 2017/0312741 A1 * | 11/2017 | Gabrielov ............... C10G 45/08 |

FOREIGN PATENT DOCUMENTS

| | | |
|---|---|---|
| GB | 1382951 | 2/1975 |
| WO | 2007084471 | 7/2007 |
| WO | 2009126319 | 10/2009 |

OTHER PUBLICATIONS

Hohenberg, P., et al.: "Inhomogeneous electron gas", Physical Review, vol. 136, No. 3B, pp. 864-871 (1964).

Levy, M: "Universal variational functionals of electron densities, first-order density matrices, and natural spin-orbitals solution of the v-representability problem", Proc. Natl. Acad. Sci. USA., vol. 76, pp. 6062-6065 (1979).

Roothaan, C.C.J.: "New developments in molecular orbital theory", Review Modern Physics, vol. 23, No. 2, pp. 69-89 (1951).

Slater, John C.: "Statistical exchange-correlation in the self-consistent field", Quantum Theory Project, University of Florida Chem., 6, 1-92 (1972).

Dewar, Michael, J.S., Development and Satus of Mindo/3 and MNDO, Jrnl. of Molecular Structure, 100, pp. 41-50 (1983).

Hedin, L., et al.: Explicit local exchange correlation potentials, J. Phys. C, Solid St. Phys. vol. 4, pp. 2064-2083 (1971).

Ceperley, D. M., Ground state of the electron gas by a stochastic method, Physical Review Letters, vol. 45, No. 7, pp. 566-569 (1980).

Perdew, John P.,: Accurate and simple analytic representation of the electron-gas correlation energy, Physical Review B, vol. 45, No. 23, pp. 13244 (1992).

Hargreaves, J.S.J., et al.: A Survey of the Influence of Binders in Zeolite Catalysis, Catalysis Science & Technology, The Royal Society of Chemistry, pp. 1165-1171, 2013.

* cited by examiner

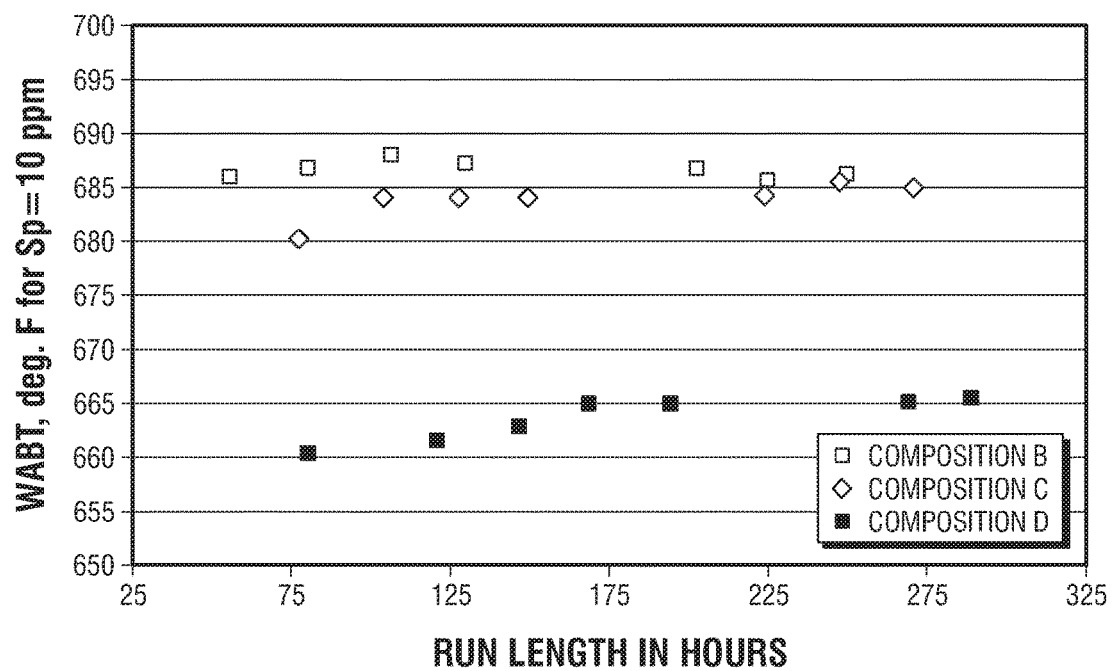

METHOD FOR RESTORING ACTIVITY TO A SPENT HYDROPROCESSING CATALYST, A SPENT HYDROPROCESSING CATALYST HAVING RESTORED CATALYTIC ACTIVITY, AND A HYDROPROCESSING PROCESS

This application is a divisional of U.S. Non Provisional application Ser. No. 13/208,167, filed Aug. 11, 2011, which claims priority to U.S. Provisional Application Ser. No. 61/373,464 filed Aug. 13, 2010, both of the entire disclosures are hereby incorporated by reference.

This invention relates to a method of restoring catalytic activity to a spent hydroprocessing catalyst, the resulting hydroprocessing catalyst and its use in the hydroprocessing of hydrocarbon feedstocks.

When a catalyst composition is used in the hydroprocessing of hydrocarbon feedstocks it will tend to lose catalytic activity over time. One of the causes of this lost catalytic activity is from the deposition of carbon or sulfur, or both, upon the surface and in the pores of the catalyst during its use which results in the catalyst activity declining over time as feedstock is passed over the catalyst. At some point in the use of the catalyst its activity will decline to a level at which the catalyst is considered to be spent in that its use is no longer economical relative to fresh catalyst or for other reasons.

There is disclosed in the art various methods of restoring lost catalytic activity to a spent catalyst. One of these methods is to burn the carbon and sulfur that is deposited upon the spent catalyst in order to provide for the restoration of at least some of the activity to the catalyst and to give a regenerated catalyst. The regenerated catalyst, however, typically does not have a restored activity that is as good as or approaches that of a fresh catalyst.

The prior art teaches a number of different approaches to restoring activity to spent catalyst. For instance, in U.S. Pat. No. 7,696,120 is disclosed a method of restoring catalytic activity to a spent hydroprocessing catalyst. In this method, at least some of the carbon that is deposited on a spent hydroprocessing catalyst is removed in a carbon removal step with the resulting regenerated catalyst, having a reduced concentration of carbon, next being subjected to a chelation treatment to provide a revitalized catalyst with a significant portion of the lost activity being restored. U.S. Pat. No. 7,696,120 is incorporated herein by reference.

While the prior art teaches a number of useful methods for restoring catalytic activity to spent hydroprocessing catalysts there is still an ongoing need to find improved or alternative methods for restoring activity to hydroprocessing catalysts that have become spent due to their use in the hydroprocessing of hydrocarbon feedstocks.

Accordingly, provided is a method for restoring catalytic activity to a spent hydroprocessing catalyst to provide an additive impregnated composition, wherein the method comprises: regenerating the spent hydroprocessing catalyst to remove at least a portion of the carbon therefrom to provide a regenerated hydroprocessing catalyst; treating the regenerated hydroprocessing catalyst with a chelating agent by incorporating the chelating agent into the regenerated hydroprocessing catalyst to thereby provide a chelant treated regenerated hydroprocessing catalyst; drying the chelant treated regenerated hydroprocessing catalyst to provide a dried chelant treated regenerated hydroprocessing catalyst having a volatiles content in the range of from 0.5 to 25 wt % LOI; and incorporating a polar additive into the dried chelant treated regenerated hydroprocessing catalyst to thereby provide the additive impregnated composition.

Further provided is a hydroprocessing catalyst composition that comprises a regenerated hydroprocessing catalyst, a chelating agent and a polar additive. This hydroprocessing catalyst composition can be used by contacting it under hydroprocessing reaction conditions with a hydrocarbon feedstock.

FIG. 1 presents a plot showing the hydrodesulfurization activity of a comparative catalyst versus the activity of a composition derived from an embodiment of the inventive method of regeneration and treatment of a catalyst that has become spent as a result of its use.

The invention relates to a method of restoring catalytic activity to a hydroprocessing catalyst that has become spent due to its use. The hydroprocessing catalyst that becomes spent as a result of its use includes any hydroprocessing catalyst known to those skilled in the art and are typically catalyst compositions that comprise a metal component on a support material. The metal component can include a Group VIB metal component or a Group VIII metal component, or both metal components. It is preferred for the hydroprocessing catalyst to comprise both a Group VIB metal component and a Group VIII metal component. The hydroprocessing catalyst can also include a promoter such as a phosphorous component.

The Group VIII metal component of the hydroprocessing catalyst composition are those Group VIII metal or metal compounds that, in combination with the other components of the catalyst composition, suitably provide a hydroprocessing catalyst. The Group VIII metal can be selected from the group consisting of nickel, cobalt, palladium and platinum. Preferably, the Group VIII metal is either nickel or cobalt and, most preferably, the Group VIII metal is cobalt.

The Group VIII metal component contained in the hydroprocessing catalyst composition can be in the elemental form or in the form of a metal compound, such as, for example, oxides, sulfides and the like. The amount of Group VIII metal in the hydroprocessing catalyst composition can be in the range of from about 0.1 about 6 weight percent elemental metal based on the total weight of the hydroprocessing catalyst composition. Preferably, the concentration of Group VIII metal in the hydroprocessing catalyst composition is in the range of from 0.3 weight % to 5 weight %, and, most preferably, the concentration is in the range of from 0.5 weight % to 4 weight %.

The Group VIB metal component of the hydroprocessing catalyst composition are those Group VIB metal or metal compounds that, in combination with the other elements of the hydroprocessing catalyst composition, suitably provide a hydroprocessing catalyst. The Group VIB metal can be selected from the group consisting of chromium, molybdenum and tungsten. The preferred Group VIB metal is either molybdenum or chromium and, most preferred, it is molybdenum.

The Group VIB metal component contained in the hydroprocessing catalyst composition can be in the elemental form or in the form of a metal compound, such as, for example, oxides, sulfides and the like. The amount of Group VIB metal in the hydroprocessing catalyst composition can be in the range of from about 5 to about 25 weight percent elemental metal based on the total weight of the hydroprocessing catalyst composition. Preferably, the concentration of Group VIB metal in the hydroprocessing catalyst composition is in the range of from 6 weight % to 22 weight %, and, most preferably, the concentration is in the range of from 7 weight % to 20 weight %.

The support material of the hydroprocessing catalyst can be any material that suitably provides a support for the metal hydrogenation components of the hydroprocessing catalyst including porous refractory oxides. Examples of possible suitable porous refractory oxides include silica, magnesia, silica-titania, zirconia, silica-zirconia, titania, titania-alumina, zirconia-alumina, silica-titania, alumina, silica-alumina, and alumino-silicate. The alumina can be of various forms, such as, alpha alumina, beta alumina, gamma alumina, delta alumina, eta alumina, theta alumina, boehmite, or mixtures thereof. The preferred porous refractory oxide is amorphous alumina. Among the available amorphous aluminas, gamma alumina is most preferred.

The porous refractory oxide generally has an average pore diameter in the range of from about 50 Angstroms to about 200 Angstroms, preferably, from 70 Angstroms to 175 Angstroms, and, most preferably, from 80 Angstroms to 150 Angstroms. The total pore volume of the porous refractory oxide, as measured by standard mercury porisimetry methods, is in the range of from about 0.2 cc/gram to about 2 cc/gram. Preferably, the pore volume is in the range of from 0.3 cc/gram to 1.5 cc/gram, and, most preferably, from 0.4 cc/gram to 1 cc/gram. The surface area of the porous refractory oxide, as measured by the B.E.T. method, generally exceeds about 100 m$^2$/gram, and it is typically in the range of from about 100 to about 400 m$^2$/gram.

As earlier noted, the hydroprocessing catalyst becomes a spent hydroprocessing catalyst by its use. The hydroprocessing catalyst can be used in the hydrotreatment of a hydrocarbon feedstock under suitable hydrotreatment process conditions. Typical hydrocarbon feedstocks can include petroleum-derived oils, for example, atmospheric distillates, vacuum distillates, cracked distillates, raffinates, hydrotreated oils, deasphalted oils, and any other hydrocarbon that can be subject to hydrotreatment. More typically, the hydrocarbon feedstock that is treated with the hydroprocessing catalyst is a petroleum distillate such as a straight run distillate or a cracked distillate with the hydrotreatment being to remove sulfur from sulfur-containing compounds or nitrogen from nitrogen-containing compounds, or both, from the hydrocarbon feedstock.

More specifically, the hydrocarbon feedstock can include such streams as naphtha, which typically contains hydrocarbons boiling in the range of from 100° C. (212° F.) to 160° C. (320° F.), kerosene, which typically contains hydrocarbons boiling in the range of from 150° C. (302° F.) to 230° C. (446° F.), light gas oil, which typically contains hydrocarbons boiling in the range of from 230° C. (446° F.) to 350° C. (662° F.), and even heavy gas oils containing hydrocarbons boiling in the range of from 350° C. (662° F.) to 430° C. (806° F.)

The hydrotreating conditions to which the hydroprocessing catalyst is subjected are not critical and are selected as is required taking into account such factors as the type of hydrocarbon feedstock that is treated and the amounts of sulfur and nitrogen contaminants contained in the hydrocarbon feedstock. Generally, the hydrocarbon feedstock is contacted with the hydroprocessing catalyst in the presence of hydrogen under hydrotreatment conditions such as a hydrotreating contacting temperature generally in the range of from about 150° C. (302° F.) to about 538° C. (1000° F.), preferably from 200° C. (392° F.) to 450° C. (842° F.) and most preferably from 250° C. (482° F.) to 425° C. (797° F.).

The hydrotreating total contacting pressure is generally in the range of from about 500 psia to about 6,000 psia, which includes a hydrogen partial pressure in the range of from about 500 psia to about 3,000 psia, a hydrogen addition rate per volume of hydrocarbon feedstock in the range of from about 500 SCFB to about 10,000 SCFB, and a hydrotreating liquid hourly space velocity (LHSV) in the range of from about 0.2 hr$^{-1}$ to 5 hr$^{-1}$. The preferred hydrotreating total contacting pressure is in the range of from 500 psia to 2,500 psia, most preferably, from 500 psia to 2,000 psia, with a preferred hydrogen partial pressure of from 800 psia to 2,000 psia, and most preferred, from 1,000 psia to 1,800 psia. The LHSV is preferably in the range of from 0.2 hr-1 to 4 hr-1, and, most preferably, from 0.2 to 3 hr-1. The hydrogen addition rate is preferably in the range of from 600 SCFB to 8,000 SCFB, and, more preferably, from 700 SCFB to 6,000 SCFB.

The hydroprocessing catalyst can become spent by it use under hydrotreatment conditions as described above. As noted, it is generally considered that one cause of the loss of catalytic activity is due to the deposition of carbonaceous material onto or into the pore structure of the hydroprocessing catalyst as a result of its use.

A spent hydroprocessing catalyst can have a carbon content generally above 0.5 weight percent (wt. %), with the weight percent being based on the total weight of the spent hydroprocessing catalyst including carbon and other components deposited upon the hydroprocessing catalyst. Typically, it is considered that for a hydroprocessing catalyst to be spent the carbon content of the spent hydroprocessing catalyst is in the range of from 1 weight percent to 25 weight percent. More typically, however, the carbon content of the spent hydroprocessing catalyst is in the range of from 2 weight percent to 23 weight percent, and, most typically, the carbon content is in the range of from 3 wt. % to 21 wt. %, or from 5 wt. % to 20 wt. %, or even from 6 wt. % to 18 wt. %.

In the inventive method and preparation of the inventive catalyst composition the spent hydroprocessing catalyst is regenerated to remove at least a portion of the carbon that is deposited thereon to provide a regenerated hydroprocessing catalyst.

Any suitable method know in the art can be used to regenerate or reduce the carbon concentration on the spent hydroprocessing catalyst to thereby provide the regenerated hydroprocessing catalyst, but a preferred method includes heat treating the spent hydroprocessing catalyst by contacting it with an oxygen-containing gas, comprising oxygen, under suitable carbon burning conditions and in a controlled manner so as to combust or burn or oxidize the carbon that is on the spent hydroprocessing catalyst and so as to provide a regenerated hydroprocessing catalyst having a reduced carbon concentration that is less than the carbon concentration on the spent hydroprocessing catalyst.

The required carbon burning conditions can be dependent upon the amount of carbon on the spent hydroprocessing catalyst and other factors, but, generally, the spent hydroprocessing catalyst is contacted with the oxygen-containing gas under regeneration conditions wherein the regeneration temperature is in the range of from 200° C. to 600° C. with a suitable heat treatment, or carbon burning, temperature being in the range of from about 250° C. to about 550° C. The preferred carbon burning temperature is in the range of from 300° C. to 500° C.

The oxygen concentration of the oxygen-containing gas can be controlled so as to provide the desired carbon burning temperature conditions. The oxygen-containing gas is preferably air, which can be diluted with other gases, for instance, inert gases such as nitrogen, to control the concentration of oxygen in the oxygen-containing gas. The carbon burn can be conducted within a combustion zone wherein is placed the spent hydroprocessing catalyst and into which is introduced the oxygen-containing gas. The time period for conducting the carbon burn is not critical and is such as to provide the regenerated hydroprocessing catalyst, having the desired carbon concentration, and it is generally in the range of from about 0.1 hours to 48 hours, or longer.

It is generally desirable for the carbon content of the regenerated hydroprocessing catalyst to be as low as is possible and, thus, the carbon content of the regenerated hydroprocessing catalyst is typically less than 1 wt. %. However, it is usually preferred for the carbon content of the regenerated hydroprocessing catalyst to be less than 0.75 wt. %, and, more preferred, the carbon content is less than 0.5 wt. %. In the most preferred embodiment of the invention, the carbon content of the regenerated hydroprocessing catalyst is less than 0.3 wt. %. A practical lower limit for the carbon content of the regenerated hydroprocessing catalyst is greater than 0.01 wt. % or even greater than 0.05 wt. %. Thus, for example, the carbon content of the regenerated hydroprocessing catalyst may be in the range of from greater than 0.01 wt. % to less than 1 wt. %.

In the inventive method, the regenerated hydroprocessing catalyst undergoes a treatment with a chelating agent to provide a chelant treated regenerated hydroprocessing catalyst that is subsequently dried. In this treatment step, a chelating agent is incorporated into the regenerated hydroprocessing catalyst by any suitable means or method, but it is preferred to contact, or wet, the regenerated hydroprocessing catalyst with a chelating agent, which is preferably dissolved in a liquid carrier, in such a manner as to assure that the chelating agent is adequately incorporated into the regenerated hydroprocessing catalyst.

The chelating agent, or chelant, suitable for use in the chelating treatment step of the inventive method includes those compounds that are capable of forming complexes with the metal components, such as any of the Group VIB metals and Group VIII metals, as described above, of the hydroprocessing catalyst. It is important to the inventive method that the chelant have properties that provide for the formation of chelate complexes with the metals of the hydroprocessing catalyst in order to pull the metals from the surface of its support material. The terms chelant, chelating agent, and chelator are used herein to mean the same thing and are considered to be a compound that functions as a ligand to form a chelate or chelate complex with a central metal ion.

The chelating agent is added to the regenerated hydroprocessing catalyst in a liquid form preferably by use of a solution containing the chelating agent which complexes with the metal of the composition. The complexes are, thus, in a liquid phase that provides for the weakening of the bounds between the metal that is present throughout the support material.

Any chelant compound that suitably provides for the formation of metal chelate complexes as required by the inventive method described herein can be used in the chelating treatment. Among these chelant compounds are those chelating agents that contain at least one nitrogen atom that can serve as the electron donor atom for forming the complexes with the metals of the dried metal-incorporated support.

Examples of possible nitrogen atom containing chelating agents include those compounds that can be classified as aminocarboxylic acids, polyamines, aminoalcohols, oximes, and polyethylene imines.

Examples of aminocarboxylic acids include ethylenediaminetetraacetic acid (EDTA), hydroxyethylenediaminetriacetic acid (HEDTA), diethylenetriaminepentaacetic acid (DTPA), and nitrilotriacetic acid (NTA).

Examples of polyamines include ethylenediamine, diethylenetriamine, triethylenetetramine, and triaminotriethylamine.

Examples of aminoalcohols include triethanolamine (TEA) and N-hydroxyethylethylenediamine.

The preferred chelating agent for use in the inventive method is an aminocarboxylic acid that can be represented by the following formula:

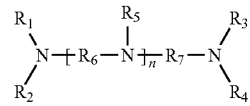

Wherein $R_1$, $R_2$, $R_3$, $R_4$ and $R_5$ are each independently selected from alkyl, alkenyl, and allyl with up to 10 carbon atoms and which may be substituted with one or more groups selected from carbonyl, carboxyl, ester, ether, amino, or amide; wherein R6 and R7 are each independently selected from an alkylene group with up to 10 carbon atoms; wherein n is either 0 or 1; and wherein one or more of the $R_1$, $R_2$, $R_3$, $R_4$ and $R_5$ has the formula:

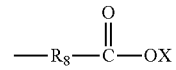

Wherein, $R_8$ is an alkylene having from 1 to 4 carbon atoms; and wherein the X is either hydrogen or another cation.

Preferred chelating agents include ethylenediaminetetraacetic acid (EDTA), hydroxyethylenediaminetriacetic acid (HEDTA), and diethylenetriaminepentaacetic acid (DTPA). The most preferred chelating agent is DTPA.

Any suitable means or method can be used to contact the regenerated hydroprocessing catalyst with the chelating agent or solution having a concentration of chelating agent; provided, such means or method provides for the suitable incorporation or impregnation of the chelating agent within the pores of the regenerated hydroprocessing catalyst. Examples of suitable methods of applying the chelating agent or chelating solution to the regenerated hydroprocessing catalyst can include dipping or spraying.

A preferred method for contacting the regenerated hydroprocessing catalyst with the chelating agent or chelating solution is by any suitable impregnation method known to those skilled in the art, for instance, impregnation by incipient wetness whereby the amount or volume of chelating solution added to the regenerated hydroprocessing catalyst is such that the total volume of the added chelating solution is in an amount that may range upwardly to about the available pore volume of the regenerated hydroprocessing catalyst to be impregnated with the chelating solution.

The chelating solution can be a solution comprising the chelating agent and a solvent that suitably provides for the dissolution of the chelating agent. Possible solvents include water and alcohols, such as, methanol and ethanol, with water being the preferred solvent for the chelating agent.

The amount of chelating agent that is applied to the regenerated hydroprocessing catalyst should be such as to provide for the desired level of metal chelate complex formation as described herein; and, generally, the amount is such as to incorporate into the regenerated hydroprocessing catalyst chelating agent in an amount in the range of from about 0.005 moles chelant to about 1 mole chelant per mole of active metal, i.e., the Group VIB and Group VIII metals, as are described above, that are in the regenerated hydroprocessing catalyst.

It is more preferred to add to the regenerated hydroprocessing catalyst an amount of chelating agent that is in the range of from 0.01 to 0.5 moles of added chelating agent per mole of hydrogenation metal. Most preferred, the amount of chelating agent added to the regenerated hydroprocessing catalyst is in the range of from 0.05 to 0.1 moles of added chelant per mole of hydrogenation metal.

After the chelating agent is incorporated into the regenerated hydroprocessing catalyst, the resulting chelant treated regenerated hydroprocessing catalyst undergoes a drying step to remove at least a portion of the solvent in order to provide a dried chelant treated regenerated hydroprocessing catalyst in which the polar additive may be incorporated.

The drying of the chelant treated regenerated hydroprocessing catalyst is to remove at least a portion of the solvent of the chelating solution from the chelant treated regenerated hydroprocessing catalyst while leaving at least a portion, preferably a major portion of the chelating agent on the chelant treated regenerated hydroprocessing catalyst. In a preferred embodiment of the invention, it is important for the dried chelant treated regenerated hydroprocessing catalyst to include therein an amount or a concentration of chelant when a polar additive is subsequently incorporated into the dried chelant treated regenerated hydroprocessing catalyst.

In the drying of the chelant treated regenerated hydroprocessing catalyst it is desirable to remove as little of the chelant therefrom as is practical and, thus, more than about 50 weight percent of the chelant that is incorporated into the chelant treated regenerated hydroprocessing catalyst, based on the total weight of chelant contained in the chelant treated regenerated hydroprocessing catalyst, will remain in the resulting dried chelant treated regenerated hydroprocessing catalyst.

It is preferred for the amount of chelant remaining on the dried chelant treated regenerated hydroprocessing catalyst to exceed 75 weight percent, and, most preferably, exceed 90 weight percent of the chelant originally added to the regenerated hydroprocessing catalyst and contained in the chelant treated regenerated hydroprocessing catalyst to remain in the dried chelant treated regenerated hydroprocessing catalyst when the polar additive is subsequently added. Thus, less than about 50 weight percent of the chelant originally added to the regenerated hydroprocessing catalyst in the chelation treatment thereof should be removed from the chelant treated regenerated hydroprocessing catalyst during the drying step. Preferably, less than 25 weight percent and, most preferably, less than 10 weight percent, of the chelant contained in the chelant treated regenerated hydroprocessing catalyst is removed therefrom.

The volatiles content of the dried chelant treated regenerated hydroprocessing catalyst should be controlled so that it does not exceed 25 wt. % LOI. LOI, or loss on ignition, is defined as the percentage weight loss of the material after its exposure to air at a temperature of 482° C. for a period of two hours. LOI can be represented by the following formula: (sample weight before exposure less sample weight after exposure) multiplied by 100 and divided by (sample weight before exposure). It is preferred for the LOI of the dried chelant treated regenerated hydroprocessing catalyst to be in the range of from 0.5 wt. % to 25 wt. % LOI, and, most preferred, from 1 wt. % to 20 wt. % LOI.

The drying can be conducted by any suitable method known to those skilled in the art. Typically, to dry the chelant treated regenerated hydroprocessing catalyst, hot air or any other suitable gas, such as nitrogen and carbon dioxide, is passed over the chelant treated regenerated hydroprocessing catalyst. The drying temperature should not exceed 200° C., and, can generally be in the range of from 90° C. to 180° C. Preferably, the drying temperature is less than 175° C. and can range from 100° C. to 175° C. The drying step is carefully controlled in order to avoid either evaporating or converting the chelant or chelates.

The available pore volume of the pores of the dried chelant treated regenerated hydroprocessing catalyst provided by drying of the chelant treated regenerated hydroprocessing catalyst may be filled with the polar additive of the invention. This is done by incorporating the polar additive into the dried chelant treated regenerated hydroprocessing catalyst to provide an additive impregnated composition by using any suitable method or means to impregnate the dried chelant treated regenerated hydroprocessing catalyst with the polar additive.

The preferred method of impregnation of the dried chelant treated regenerated hydroprocessing catalyst with the polar additive may be any standard well-known pore fill methodology whereby the pore volume is filled by taking advantage of capillary action to draw the liquid into the pores of the dried chelant treated regenerated hydroprocessing catalyst. It is desirable to fill at least 75% of the available pore volume of the dried chelant treated regenerated hydroprocessing catalyst with the polar additive, and, preferably, at least 80% of the available pore volume of the dried chelant treated regenerated hydroprocessing catalyst is filled with the polar additive. Most preferably, at least 90% of the available pore volume of the dried chelant treated regenerated hydroprocessing catalyst is filled with the polar additive.

In addition to the dispersing of metal complexes by the polar additive, it is also thought that the presence of the polar additive in the additive impregnated composition, when it is placed in catalytic service or when it undergoes an activation in order to use the composition in catalytic service, provides certain benefits that help give a much more active catalyst than those of the prior art.

The polar additive that may be used in the preparation of the inventive composition can be any suitable molecule that provides for the benefits and has the characteristic molecular polarity or molecular dipole moment and other properties, if applicable, as are described herein, and as are disclosed in co-pending Patent application U.S. application Ser. No. 12/407,479, filed Mar. 19, 2009, (U. S. Publication No. US20100236988), which is incorporated herein by reference.

Molecular polarity is understood in the art to be a result of non-uniform distribution of positive and negative charges of the atoms that make up a molecule. The dipole moment of a molecule may be approximated as the vector sum of the individual bond dipole moments, and it can be a calculated value.

One method of obtaining a calculated value for the dipole moment of a molecule, in general, includes determining by calculation the total electron density of the lowest energy conformation of the molecule by applying and using gradient corrected density functional theory. From the total electron density the corresponding electrostatic potential is derived and point charges are fitted to the corresponding nuclei. With the atomic positions and electrostatic point charges known, the molecular dipole moment can be calculated from a summation of the individual atomic moments.

As the term is used in this description and in the claims, the "dipole moment" of a given molecule is that as determined by calculation using the publicly available, under license, computer software program named Materials Studio, Revision 4.3.1, copyright 2008, Accerlys Software Inc.

Following below is a brief discussion of some of the technical principles behind the computation method and application of the Materials Studio computer software program for calculating molecular dipole moments.

The first step in the determination of the calculated value of the dipole moment of a molecule using the Materials Studio software involves constructing a molecular representation of the compound using the sketching tools within the visualizer module of Materials Studio. This sketching process involves adding atoms to the sketcher window that constitute the compound and completing the bonds between these atoms to fulfill the recognized bonding connectivity that constitute the compound. Using the clean icon within the Material Studio program automatically orients the constructed compound into the correct orientation. For complex compounds, a conformational search is performed to ensure that the orientation used to calculate the molecular dipole is the lowest energy conformation, i.e., its natural state.

The quantum mechanical code DMol3 (Delley, B. *J. Chem. Phys.*, 92, 508 (1990)) is utilized to calculate the molecular dipole moments from first principles by applying density functional theory. Density functional theory begins with a theorem by Hohenberg and Kohn (Hohenberg, P.; Kohn, W. "Inhomogeneous electron gas", *Phys. Rev. B,* 136, 864-871 (1964); Levy, M. "Universal variational functionals of electron densities, first-order density matrices, and natural spin-orbitals and solution of the v-representability problem", *Proc. Natl. Acad. Sci. U.S.A.,* 76, 6062-6065 (1979)), which states that all ground-state properties are functions of the charge density $\rho$. Specifically, the total energy $E_t$ may be written as:

$$E_t[\rho] = T[\rho] + U[\rho] + E_{xc}[\rho] \quad \text{Eq. 1}$$

where $T[\rho]$ is the kinetic energy of a system of noninteracting particles of density $\rho$, $U[\rho]$ is the classical electrostatic energy due to Coulombic interactions, and $E_{xc}[\rho]$ includes all many-body contributions to the total energy, in particular the exchange and correlation energies.

As in other molecular orbital methods (Roothaan, C. C. J. "New developments in molecular orbital theory", *Rev. Mod. Phys.,* 23, 69-89 (1951); Slater, J. C. "Statistical exchange-correlation in the self-consistent field", *Adv. Quantum Chem.,* 6, 1-92 (1972); Dewar, M. J. S. *J. Mol. Struct.,* 100, 41 (1983)), the wavefunction is taken to be an antisymmetrized product (Slater determinant) of one-particle functions, that is, molecular orbitals:

$$\Psi = A(n) |\phi_1(1)\phi_2(2) \ldots \phi_n(n)| \quad \text{Eq. 2}$$

The molecular orbitals also must be orthonormal:

$$\langle \phi_i | \phi_j \rangle = \delta_{ij} \quad \text{Eq. 3}$$

The charge density summed over all molecular orbitals is given by the simple sum:

$$\rho(r) = \sum_i |\phi_i(r)|^2 \quad \text{Eq. 4}$$

where the sum goes over all occupied molecular orbitals $\phi_i$. The density obtained from this expression is also known as the charge density. From the wavefunctions and the charge density the energy components from Eq. 1 can be written (in atomic units) as:

$$T = \left\langle \sum_i^n \phi_i \left| \frac{-\nabla^2}{2} \right| \phi_i \right\rangle \quad \text{Eq. 5}$$

In Eq. 6, $Z\alpha$ refers to the charge on nucleus $\alpha$ of an N-atom system. Further, in Eq. 6, the term $\rho(r_1)V_N$, represents the electron-nucleus attraction, the term $\rho(r_1)V_e(r_1)/2$, represents the electron-electron repulsion, and the term, $V_{NN}$, represents the nucleus-nucleus repulsion.

$$\begin{aligned} U &= \sum_i^n \sum_\alpha^N \left\langle \phi_i(r) \left| \frac{-Z}{R_\alpha - r} \right| \phi_i(r) \right\rangle + \\ &\quad \frac{1}{2} \sum_i \sum_j \left\langle \phi_i(r_1)\phi_j(r_2) \frac{1}{r_1 - r_2} \phi_i(r_1)\phi_j(r_2) \right\rangle + \\ &\quad \sum_\alpha^N \sum_{\beta<\alpha} \frac{Z_\alpha Z_\beta}{|R_\alpha - R_\beta|} \\ &= -\sum_\alpha^N \left\langle \rho(r_1) \frac{Z_\alpha}{|R_\alpha - r_1|} \right\rangle + \frac{1}{2} \left\langle \rho(r_1)\rho(r_2) \frac{1}{|r_1 - r_2|} \right\rangle + \\ &\quad \sum_\alpha^N \sum_{\beta<\alpha} \frac{Z_\alpha Z_\beta}{|R_\alpha - R_\beta|} \\ &\equiv \langle -\rho(r_1)V_N \rangle + \left\langle \rho(r_1)\frac{V_e(r_1)}{2} \right\rangle + V_{NN} \end{aligned} \quad \text{Eq. 6}$$

The term, $E_{xc}[\rho]$ in Eq. 1, the exchange-correlation energy, requires some approximation for this method to be computationally tractable. A simple and surprisingly good approximation is the local density approximation, which is based on the known exchange-correlation energy of the uniform electron gas. (Hedin, L.; Lundqvist, B. I. "Explicit local exchange correlation potentials", *J. Phys. C,* 4, 2064-2083 (1971); Ceperley, D. M.; Alder, B. J. "Ground state of the electron gas by a stochastic method", *Phys. Rev. Lett.,* 45, 566-569 (1980)). The local density approximation assumes that the charge density varies slowly on an atomic scale (i.e., each region of a molecule actually looks like a uniform electron gas). The total exchange-correlation energy can be obtained by integrating the uniform electron gas result:

$$\varepsilon_{xc}[\rho] \cong \int \rho(r) \varepsilon_{xc}[\rho(r)] dr \quad \text{Eq. 7}$$

where $E_{xc}[\rho]$ is the exchange-correlation energy per particle in a uniform electron gas and $\rho$ is the number of particles. In this work the gradient corrected exchange-correlation functional PW91 is used (Perdew, J. P.; Wang, Y. *Phys. Rev. B,* 45, 13244 (1992)).

With all the components derived to describe the total energy of any molecular system within the density functional formalism, the dipole moment can be calculated from a summation of the individual electronic and nuclear dipole moment vectors which are displayed at the end of the DMol3 output file.

References herein to the polar additive are understood to mean a molecule that has polarity and having a dipole moment, as calculated by the aforementioned Materials Studio software or other known method that will provide substantially the same calculated value for the dipole moment of a molecule as the Materials Studio software will provide, which exceeds the dipole moment of the hydrocarbon oil that is used in the inventive composition.

The dipole moment of the polar additive should be at least or exceed 0.45. However, it is preferred for the polar additive to have a characteristic dipole moment that is at least or exceeds 0.5, and, more preferred, the dipole moment of the polar additive should be at least or exceed 0.6. A typical upper limit to the dipole moment of the polar additive is up to about 5, and, thus, the dipole moment of the polar additive may be, for example, in the range of from 0.45 to 5. It is preferred for the dipole moment of the polar additive to be in the range of from 0.5 to 4.5, and, more preferred, the dipole moment is to be in the range of from 0.6 to 4.

As alluded to above, it is theorized that the polarity of the polar additive is significant to the invention; because, the polarity is required for the interaction with the surface of the support material and active metal components of the support material of the inventive composition. It is by these interactions that physical and chemical bonds with the active phases of the inventive composition are formed.

A particularly desirable attribute of the polar additive is for it to be a heterocompound. A heterocompound is considered herein to be a molecule that includes atoms in addition to carbon and hydrogen. These additional atoms can include, for example, nitrogen or oxygen, or both. It is desirable for the group of heterocompounds to exclude those heterocompounds that include sulfur, and, in all cases, the polar additive does not include paraffin and olefin compounds, i.e. compounds that contain only carbon and hydrogen atoms. Considering the exclusion of sulfur-containing compounds from the definition of the group of heterocompounds, it can further be desirable for the oil and additive impregnated composition, before its treatment with hydrogen and sulfur, to exclude the material presence of a sulfur-containing compound.

Specific polar compounds that may be suitable for use as the polar additive of the invention are presented in the following Table 1, which also includes their calculated dipole moments.

TABLE 1

Polar Compounds and Their Calculated Dipole Moments

| Compound | Formula | Class | Boiling Point (° C.) | Calc. Dipole Moment |
|---|---|---|---|---|
| 2,4-pentanedione | $C_5H_8O_2$ | Diketone | 140 | 1.59 |
| Triethylphosphate | $C_6H_{15}O_4P$ | Phosphate | 215-216 | 3.25 |
| Triethylphosphite | $C_6H_{15}O_3P$ | Phosphite | 156 | 0.64 |
| 1-pentanol | $C_5H_{12}O$ | Alcohol | 138 | 1.85 |
| Guanidine | $CH_5N_3$ | Imine | n/a | 3.8 |
| Alanine | $C_3H_7NO_2$ | Amino acid | n/a | 2.16 |
| Glycine | $C_2H_5NO_2$ | Amino acid | n/a | 5.81 |
| Ethyleenediamine | $C_2H_8N_2$ | Diamine | 116 | 2.46 |
| Monoethanolamine | $C_2H_7NO$ | Alcohol-amine | 170 | 3.42 |
| Tetramethylurea | $C_5H_{12}N_2O$ | Diamine | 174-178 | 3.44 |
| Acetonitrile | $C_2H_3N$ | Nitrile | 82 | 3.87 |
| n-methylpyrrolidone | $C_5H_9NO$ | Cyclic-amide | 202 | 3.92 |
| Glucose | $C_6H_{12}O_6$ | sugar | n/a | 4.38 |
| Sucrose | $C_{12}H_{22}O_{11}$ | sugar | n/a | 7.45 |
| Octylamine | $C_8H_{19}N$ | Amine | 175-176 | 1.36 |
| Phenylboromic acid | $C_6H_7BO_2$ | Boric acid | n/a | 5.86 |
| n-ethylcarbazole | $C_{14}H_{13}N$ | Carbazole | n/a | 1.93 |
| Acetophenone | $C_8H_8O$ | ketone | 202 | 3.15 |
| Diethyleneglycol | $C_4H_{10}O_3$ | Alcohol | 244-245 | 2.76 |
| Dibenzofuran | $C_{12}H_8O$ | Oxygen heterocycle | 285 | 0.78 |
| Dimethylformamide | $C_3H_7NO$ | Amide | 153 | 4.02 |
| Citric acid | $C_6H_8O_7$ | Carboxylic acid | 175 | 3.37 |
| Ethylenediaminetetraacetic acid | $C_{10}H_{16}N_2O_8$ | Polyamino carboxylic acid | n/a | 3.99 |
| Nitriltriacetic acid | $C_6H_9NO_6$ | Polyamino carboxylic acid | n/a | 1.58 |

A preferred characteristic of the polar additive is for its boiling temperature to be in the range of from 50° C. to 275° C. More preferably, the boiling temperature of the polar additive is to be in the range of from 60° C. to 250° C., and, most preferably, it is in the range of from 80° C. to 225° C.

The most desirable compounds for use as the polar additive of the invention are those selected from the group of amide compounds, which includes dimethylformamide.

The additive impregnated composition of the invention may be treated, either ex situ or in situ, with hydrogen and with a sulfur compound, and, indeed, it is one of the beneficial features of the invention that it permits the shipping and delivery of a non-sulfurized composition to a reactor in which it can be activated, in situ, by a hydrogen treatment step followed by a sulfurization step. In the activation of the additive impregnated composition it first can undergo a hydrogen treatment that is then followed with treatment with a sulfur compound.

The hydrogen treatment includes exposing the additive impregnated composition to a gaseous atmosphere containing hydrogen at a temperature ranging upwardly to 250° C. Preferably, the additive impregnated composition is exposed to the hydrogen gas at a hydrogen treatment temperature in the range of from 100° C. to 225° C., and, most preferably, the hydrogen treatment temperature is in the range of from 125° C. to 200° C.

The partial pressure of the hydrogen of the gaseous atmosphere used in the hydrogen treatment step generally can be in the range of from 1 bar to 70 bar, preferably, from 1.5 bar to 55 bar, and, most preferably, from 2 bar to 35 bar. The additive impregnated composition is contacted with the gaseous atmosphere at the aforementioned temperature and pressure conditions for a hydrogen treatment time period in the range of from 0.1 hours to 100 hours, and, preferably, the hydrogen treatment time period is from 1 hour to 50 hours, and most preferably, from 2 hours to 30 hours.

Sulfiding of the additive impregnated composition after it has been treated with hydrogen can be done using any conventional method known to those skilled in the art. Thus, the hydrogen treated additive impregnated composition can be contacted with a sulfur-containing compound, which can be hydrogen sulfide or a compound that is decomposable into hydrogen sulfide, under the contacting conditions of the invention. Examples of such decomposable compounds include mercaptans, $CS_2$, thiophenes, dimethyl sulfide (DMS), and dimethyl disulfide (DMDS). Also, preferably, the sulfiding is accomplished by contacting the hydrogen treated composition, under suitable sulfurization treatment conditions, with a hydrocarbon feedstock that contains a concentration of a sulfur compound. The sulfur compound of the hydrocarbon feedstock can be an organic sulfur compound, particularly, one which is typically contained in petroleum distillates that are processed by hydrodesulfurization methods.

Suitable sulfurization treatment conditions are those which provide for the conversion of the active metal components of the hydrogen treated hydrocarbon oil and polar additive impregnated composition to their sulfided form. Typically, the sulfiding temperature at which the hydrogen treated hydrocarbon oil and polar additive impregnated composition is contacted with the sulfur compound is in the range of from 150° C. to 450° C., preferably, from 175° C. to 425° C., and, most preferably, from 200° C. to 400° C.

When using a hydrocarbon feedstock that is to be hydrotreated using the catalyst composition of the invention to sulfide the hydrogen treated composition, the sulfurization conditions can be the same as the process conditions under which the hydrotreating is performed. The sulfiding pressure at which the hydrogen treated additive impregnated composition is sulfided generally can be in the range of from 1 bar to 70 bar, preferably, from 1.5 bar to 55 bar, and, most preferably, from 2 bar to 35 bar.

One of the benefits provided by the additive impregnated composition of the invention is that it can be utilized in a reactor system that is started up using a so-called delayed feed introduction procedure. In the delayed feed introduction procedure, the reactor system, which includes a reactor vessel containing the additive impregnated composition, first undergoes a heating step to raise the temperature of the reactor and the additive impregnated composition contained therein in preparation for the introduction of a sulfiding agent or heated hydrocarbon feedstock for processing. This heating step includes introducing into the reactor the hydrogen-containing gas at the aforementioned hydrogen treatment conditions. After the hydrogen treatment of the additive impregnated composition, it is thereafter treated with a sulfur compound in the manner as earlier described herein.

It has been found that the additive impregnated composition, after undergoing the hydrogen treatment followed by treatment with a sulfur compound, exhibits a greater catalytic hydrotreating activity of a distillate feedstock than do other similar, but non-impregnated compositions.

It is recognized that the additive impregnated composition of the invention, after its treatment with hydrogen and sulfur, is a highly effective catalyst for use in the hydrotreating of hydrocarbon feedstocks. This catalyst is particularly useful in applications involving the hydrodesulfurization or hydrodenitrogenation of hydrocarbon feedstocks, and, especially, it has been found to be an excellent catalyst for use in the hydrodesulfurization of distillate feedstocks, in particular, diesel, to make an ultra-low sulfur distillate product having a sulfur concentration of less than 15 ppmw, preferably, less than 10 ppmw, and, most preferably, less than 8 ppmw.

In the hydrotreating applications, the additive impregnated composition, preferably used in a delayed feed introduction procedure or otherwise treated with hydrogen and sulfur, as described above, is contacted under suitable hydrodesulfurization conditions with a hydrocarbon feedstock that typically has a concentration of sulfur. The more typical and preferred hydrocarbon feedstock is a petroleum middle distillate cut having a boiling temperature at atmospheric pressure in the range of from 140° C. to 410° C. These temperatures are approximate initial and boiling temperatures of the middle distillate. Examples of refinery streams intended to be included within the meaning of middle distillate include straight run distillate fuels boiling in the referenced boiling range, such as, kerosene, jet fuel, light diesel oil, heating oil, heavy diesel oil, and the cracked distillates, such as FCC cycle oil, coker gas oil, and hydrocracker distillates. The preferred feedstock of the inventive distillate hydrodesulfurization process is a middle distillate boiling in the diesel boiling range of from about 140° C. to 400° C.

The sulfur concentration of the middle distillate feedstock can be a high concentration, for instance, being in the range upwardly to about 2 weight percent of the distillate feedstock based on the weight of elemental sulfur and the total weight of the distillate feedstock inclusive of the sulfur compounds. Typically, however, the distillate feedstock of the inventive process has a sulfur concentration in the range of from 0.01 wt. % (100 ppmw) to 1.8 wt. % (18,000). But, more typically, the sulfur concentration is in the range of from 0.1 wt. % (1000 ppmw) to 1.6 wt. % (16,000 ppmw), and, most typically, from 0.18 wt. % (1800 ppmw) to 1.1 wt. % (11,000 ppmw). It is understood that the references herein to the sulfur content of the distillate feedstock are to those compounds that are normally found in a distillate feedstock or in the hydrodesulfurized distillate product and are chemical compounds that contain a sulfur atom and which generally include organosulfur compounds.

The additive impregnated composition of the invention may be employed as a part of any suitable reactor system that provides for contacting it or its derivatives with the distillate feedstock under suitable hydrodesulfurization conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulfur distillate product from the reactor vessel.

The hydrodesulfurization process generally operates at a hydrodesulfurization reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydrodesulfurization reaction temperature is generally in the range of from 200° C. (392° F.) to 420° C. (788° F.), preferably, from 260° C. (500° F.) to 400° C. (752° F.), and, most preferably, from 320° C. (608° F.) to 380° C. (716° F.). It is recognized that one of the unexpected features of the use of the inventive additive impregnated composition of the invention is that it has a significantly higher catalytic activity than certain other alternative catalyst compositions, and, thus, it will, in general, provide for comparatively lower required process temperatures for a given amount of hydrotreatment of a feedstock.

The flow rate at which the distillate feedstock is charged to the reaction zone of the inventive process is generally such as to provide a liquid hourly space velocity (LHSV) in the range of from 0.01 $hr^{-1}$ to 10 $hr^{-1}$. The term "liquid hourly space velocity", as used herein, means the numerical ratio of the rate at which the distillate feedstock is charged to the reaction zone of the inventive process in volume per hour divided by the volume of catalyst contained in the reaction zone to which the distillate feedstock is charged. The preferred LHSV is in the range of from 0.05 $hr^{-1}$ to 5 $hr^{-1}$, more preferably, from 0.1 $hr^{-1}$ to 3 $hr^{-1}$. and, most preferably, from 0.2 $hr^{-1}$ to 2 $hr^{-1}$.

It is preferred to charge hydrogen along with the distillate feedstock to the reaction zone of the inventive process. In this instance, the hydrogen is sometimes referred to as hydrogen treat gas. The hydrogen treat gas rate is the amount of hydrogen relative to the amount of distillate feedstock charged to the reaction zone and generally is in the range upwardly to 1781 m$^3$/m$^3$ (10,000 SCF/bbl). It is preferred for the treat gas rate to be in the range of from 89 m$^3$/m$^3$ (500 SCF/bbl) to 1781 m$^3$/m$^3$ (10,000 SCF/bbl), more preferably, from 178 m$^3$/m$^3$ (1,000 SCF/bbl) to 1602 m$^3$/m$^3$ (9,000 SCF/bbl), and, most preferably, from 356 m$^3$/m$^3$ (2,000 SCF/bbl) to 1425 m$^3$/m$^3$ (8,000 SCF/bbl).

The desulfurized distillate product yielded from the process of the invention has a low or reduced sulfur concentration relative to the distillate feedstock. A particularly advantageous aspect of the inventive process is that it is capable of providing a deeply desulfurized diesel product or an ultra-low sulfur diesel product. As already noted herein, the low sulfur distillate product can have a sulfur concentration that is less than 50 ppmw or any of the other noted sulfur concentrations as described elsewhere herein (e.g., less than 15 ppmw, or less than 10 ppmw, or less than 8 ppmw).

The following Examples are presented to illustrate the invention, but they should not be construed as limiting the scope of the invention.

EXAMPLE 1

This Example describes the regeneration and revitalization by chelation treatment of a commercially available hydroprocessing catalyst (Reference Catalyst) that has become spent by it use in the treatment of a hydrocarbon feedstock. The regenerated and revitalized product is identified as Catalyst A.

The alumina support particle used in the compositions of Examples 1-4 was made by mixing alumina and water to form a mixture that was extruded into 1.3 mm Trilobe extrudates. The shaped support extrudates were dried and calcined using standard drying and calcination techniques so as to provide an alumina carrier for loading the active metals and additive components of the compositions. The properties of the shaped alumina support are presented in Table 2 below.

TABLE 2

Properties of Shaped Support

| Property | Value |
| --- | --- |
| Shape | 1.3 mm Trilobe |
| Surface area (m2/g) | 245 to 320 |
| Mean pore diameter (Ang.) | 80 to 100 |
| Pore volume greater than 350 Ang. (%) | Less than 5 |
| Water pore volume (cc/g) | 0.74 to 0.90 |
| Nickel (wt. %) | 1.0 |

An amount of the shaped support described above, was impregnated with an aqueous impregnation solution (metal-containing solution) comprising a nickel component, a molybdenum component, and a phosphorous component. The aqueous impregnation solution was prepared by dissolving nickel oxide (NiO), molybdenum trioxide (MoO$_3$) and phosphoric acid in de-ionized water with heating and stirring. A volume of the aqueous impregnation solution was used to fill the pores of the extrudate so as to load it with 4.5 wt % cobalt, 1.5% nickel, 16.5 wt % molybdenum, and 3.1 wt % phosphorous, with the weight percents being on a dry basis and the metals as element. The impregnated shaped particles (extrudates) were allowed to age for two hours, and, then dried in air at a drying temperature of 100° C. to reduce the volatiles content to 7.3 wt %. The catalyst precursor was then presulfurized, ex situ, followed by its use in the hydrotreatment of a distillate feedstock under commercial processing conditions until spent and then regenerated by the burning of the deposited coke to thereby provide Composition A. Composition A was not treated with and did not contain a chelating agent or a polar additive.

EXAMPLE 2

This Example 2 describes the preparation of comparative Composition B that has not been subject to a chelating treatment but included a polar additive.

Composition A was impregnated with the polar additive dimethylformamide (DMF) to fill substantially all of the free pore volume to provide Composition B.

EXAMPLE 3

This Example 3 describes the preparation of comparative Composition C that has been treated with a chelating agent but does not include a polar additive.

Composition A was impregnated with a solution comprising the chelating agent diethylenetriaminepentaacetic acid (DTPA). This solution was prepared as follows: 2726 weight parts of deionized water was mixed with 283 weight parts DTPA powder (99% concentration, BASF, Trilon C Powder). To this mixture, 105 weight parts ammonium hydroxide at 29% NH$_3$ concentration was added. Heat was used as needed to dissolve the components of the solution. The final solution had a specific gravity of approximately 1.04 g/cc and solution concentrations of 9% DTPA and 0.98% NH$_3$. In the impregnation of Composition A with the solution comprising the chelating agent, a substantial proportion of the free pore volume was filled with the solution.

Following the pore volume impregnation of Composition A with the solution of chelating agent, the chelant treated Composition A (chelant treated metal-incorporated support) was dried in air at a temperature in the range of from 120 to 130° C. for 4 hours to yield Composition C.

EXAMPLE 4

This Example 4 describes the preparation of Composition D, which is one embodiment of the inventive composition, containing hydrogenation metal components and which has been treated with a chelating agent and filled with a polar additive.

Composition A was impregnated with a solution comprising the chelating agent diethylenetriaminepentaacetic acid (DTPA). This solution was prepared as follows: 2726 weight parts of deionized water was mixed with 283 weight parts DTPA powder (99% concentration, BASF, Trilon C Powder). To this mixture 105 weight parts ammonium hydroxide at 29% NH$_3$ concentration was added. Heat was used as needed to dissolve the components of the solution. The final solution had a specific gravity of approximately 1.04 g/cc and solution concentrations of 9% DTPA and 0.98% NH$_3$. In the impregnation of Composition A with the solution comprising the chelating agent, a substantial proportion of the free pore volume was filled with the solution.

Following the pore volume impregnation of Composition A with the solution of chelating agent, the chelant treated Composition A (chelant treated metal-incorporated support) was dried in air at a temperature in the range of from 120 to 130° C. for 4 hours to eliminate excess moisture and reduce the volatiles content thereof to a target LOI and to free up pore volume that could subsequently be filled with a polar additive. The dried chelant treated Composition A (dried chelant treated metal-incorporated support) was then filled by pore volume impregnation with the polar additive dimethylformamide (DMF) to at least a 90% pore volume fill to give the inventive Composition D (additive impregnated composition).

EXAMPLE 5

This Example 5 describes the procedure for testing the catalytic performance of the compositions of Examples 2-4, and it presents the performance results from their use in the hydrotreating of a gas oil feedstock (activity testing).

Trickle flow micro-reactors were used to test the hydrodesulfurization activity of Compositions B, C and D. A 50 cc volume, based on compacted bulk density of whole pellets, of each composition was used in the testing. The reactors were packed with extrudates of each composition, which were diluted with 80-60 mesh SiC in the volumetric composition-to-diluent ratio of 1:2.8. The compositions were conditioned and sulfided using a delayed-feed introduction procedure whereby the composition was first heated up and conditioned by contacting it with pure hydrogen at the operating pressure and at a temperature in the range of from 149° C. (300° F.) to 204° C. (400° F.) for a time period of about 12 hours. Following this hydrogen treatment, the composition was sulfided using a liquid hydrocarbon containing TNPS to provide a sulfur content of 2.5%.

The activity of the compositions were tested by charging the reactor with a blended feedstock of a diesel boiling range having the distillation properties (per ASTM test D 2287) that are presented in Table 3. The feedstock had a sulfur content of 1.71 wt. %, and it was charged to the reactor, which was operated at a pressure of 600 psig, at a rate so as to provide a liquid hourly space velocity (LHSV) of 1.0 hr$^{-1}$. The hydrogen gas rate charged to the reactor was 1200 scf H$_2$/bbl. The weight average bed temperature (WABT) was adjusted to provide a treated product having a sulfur content that was 10 ppmw.

TABLE 3

Distillation (D-2287) of Diesel Feedstock With 1.71 wt. % Sulfur

| % | ° F. |
|---|---|
| IBP | 272 |
| 5 | 387 |
| 10 | 440 |
| 20 | 489 |
| 30 | 520 |
| 40 | 539 |
| 50 | 558 |
| 60 | 578 |
| 70 | 600 |
| 80 | 624 |
| 90 | 652 |
| 95 | 674 |
| EP | 776 |

FIG. 1 presents the results of the testing with activity determined as the WABT required to achieve targeted 10 ppm sulfur content in the product. It can be observed from the presented plots that the inventive Composition D exhibits a higher activity (a lower WABT for the given HDS level) than the comparative Compositions B and C. Composition D provided 10 ppm total sulfur in the product at c.a. 665° F. whereas Compositions B and C showed a 10 ppm total sulfur in the product at c.a. 685° F. Composition D provides a significant temperature advantage of at least a 11.1° C. (20° F.) over either Composition B or Composition C.

The invention claimed is:

1. An activity-restored hydroprocessing catalyst composition, comprising:
a regenerated hydroprocessing catalyst, comprising a hydroprocessing catalyst, including a Group VIII metal component, a Group VIB metal component, and a support material, that has become spent by use under hydrotreatment conditions to provide a spent hydroprocessing catalyst containing a carbon content above 0.5 wt. %, wherein said spent hydroprocessing catalyst is heat treated by contacting it with an oxygen-containing gas under carbon burning conditions to provide said regenerated hydroprocessing catalyst having a reduced carbon concentration less than that of the spent hydroprocessing catalyst;
a chelating agent selected from the group of compounds consisting of aminocarboxylic acids, polyamines, aminoalcohols, oximes, and polyethyleneimines; and
a polar additive that is a heterocompound having polarity and a dipole moment of at least 0.45.

2. An activity-restored hydroprocessing catalyst composition as recited in claim 1, wherein said chelating agent is an aminocarboxylic acid selected from the group of compounds consisting of ethylenediaminetetraacetic acid (EDTA) hydroxyethylenediaminetriacetic acid (HEDTA), diethylenetriaminepentaacetic acid (DTPA), and nitrilotriacetic acid (NTA).

3. An activity-restored hydroprocessing catalyst composition as recited in claim 2, wherein said polar additive is amide compound.

4. An activity-restored hydroprocessing catalyst composition as recited in claim 3, wherein said Group VIII metal component is either nickel or cobalt present in said hydroprocessing catalyst in an amount in the range of from 0.1 to 6 weight percent, based on the metal as an element and the total weight of the hydroprocessing catalyst, and said Group VIB metal component is either molybdenum or chromium present in said hydroprocessing catalyst in an amount in the range of from 5 to 25 weight percent, based on the metal as an element and the total weight of the hydroprocessing catalyst.

5. An activity-restored hydroprocessing catalyst composition as recited in claim 4, wherein said support material comprises alumina.

6. An activity-restored hydroprocessing catalyst composition as recited in claim 5, wherein said polar additive has a boiling temperature within the range of from 50° C. to 275° C.

7. An activity-restored hydroprocessing catalyst composition as recited in claim 6, wherein said polar additive is dimethylformamide.

8. An activity-restored hydroprocessing catalyst composition as recited in claim 7, wherein said chelating agent is present in said regenerated hydroprocessing catalyst in an amount in the range of from 0.005 mole chelant per mole of active Group VIB and Group VIII metal (0.005 mole/mole) to 1 mole chelant per mole of active Group VIB and Group VIII metal (1 mole/mole).

9. An activity-restored hydroprocessing catalyst composition as recited in claim 8, wherein said chelating agent is diethylenetriaminepentaacetic acid (DTPA).

10. A hydroprocessing process, comprising: contacting under hydroprocessing conditions the composition of claim 3.

11. A hydroprocessing process, comprising: contacting under hydroprocessing conditions the composition of claim 2.

12. A hydroprocessing process, comprising: contacting under hydroprocessing conditions the composition of claim 1.

\* \* \* \* \*